(12) United States Patent
Schramek et al.

(10) Patent No.: US 7,183,966 B1
(45) Date of Patent: Feb. 27, 2007

(54) DUAL MODE TARGET SENSING APPARATUS

(75) Inventors: Robert J. Schramek, Leo, IN (US); Ronald E. Byrd, Alamonte Springs, FL (US); Michael E. Weinstein, Lake Mary, FL (US); Seong-Hwoon Kim, Ocoee, FL (US); Allan J. Lyon, Longwood, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 599 days.

(21) Appl. No.: 10/420,833

(22) Filed: Apr. 23, 2003

(51) Int. Cl.
*G01S 13/86* (2006.01)
*G01S 13/04* (2006.01)
*F41G 7/00* (2006.01)

(52) U.S. Cl. .................. 342/53; 342/27; 342/52; 342/54; 342/61; 342/62; 342/63; 244/3.1; 244/3.15; 244/3.16; 244/3.19

(58) Field of Classification Search .......... 244/3.1–3.3; 342/27, 28, 52–59, 61–68, 175, 192–197
See application file for complete search history.

(56) References Cited

U.S. PATENT DOCUMENTS

| | | | |
|---|---|---|---|
| 3,165,749 A * | 1/1965 | Cushner | 244/3.16 |
| 4,085,910 A | 4/1978 | Baker et al. | |
| 4,240,596 A * | 12/1980 | Winderman et al. | 244/3.16 |
| 4,264,907 A * | 4/1981 | Durand et al. | 342/53 |
| 4,467,327 A | 8/1984 | Drake et al. | |
| 4,477,814 A | 10/1984 | Brumbaugh et al. | |
| 4,576,346 A | 3/1986 | Gauggel et al. | |
| 4,866,454 A | 9/1989 | Droessler et al. | |
| 4,965,453 A | 10/1990 | Hoschette et al. | |
| 5,182,564 A | 1/1993 | Burkett et al. | |
| 5,268,680 A * | 12/1993 | Zantos | 342/53 |
| 5,307,077 A | 4/1994 | Branigan et al. | |
| 5,308,984 A | 5/1994 | Slawsby et al. | |
| 5,681,009 A | 10/1997 | Vandersteen et al. | |
| 5,784,156 A | 7/1998 | Nicholson | |
| 5,944,281 A | 8/1999 | Pittman et al. | |
| 6,150,974 A * | 11/2000 | Tasaka et al. | 342/53 |
| 6,262,800 B1 * | 7/2001 | Minor | 244/3.13 |
| 6,268,822 B1 * | 7/2001 | Sanders et al. | 342/54 |

* cited by examiner

*Primary Examiner*—Bernarr E. Gregory
(74) *Attorney, Agent, or Firm*—Buchanan Ingersoll & Rooney

(57) ABSTRACT

A dual-mode target seeking apparatus having a seeker dome defining an aperture and transmissive to microwave frequency energy of a first frequency and to light wave energy at a second frequency and at a third frequency. An optics system within the seeker dome is transmissive to the microwave frequency energy reflective to the light wave energy received via the aperture. A first detector receives the microwave frequency energy via the aperture, and a second detector images a target by the light wave energy of the second and third frequencies via the optics system.

22 Claims, 7 Drawing Sheets

SAL Pulse Detection

SAL Imaging on FPA

IR Imaging on FPA

DUAL MODE TARGET SENSING APPARATUS

BACKGROUND

1. Field of the Invention

The present invention relates to optical systems and imaging elements. In particular, the present invention relates to a target sensing apparatus for use in missile targeting.

2. Background of the Invention

Receivers capable of receiving both millimeter wave and laser energy sources have been developed. U.S. Pat. No. 5,182,564 to Burkett et al. discloses a guidance apparatus with a dual mode sensor. Another dual mode receiver is found in U.S. Pat. No. 4,085,910 to Baker et al. U.S. Pat. No. 5,944,281 to Pittmann et al. discloses a dual band millimeter infrared fiber optics guidance data link.

U.S. Pat. No. 4,866,454 to Drausler et al. discloses a multi spectral imaging apparatus having an antenna for receiving radio frequencies and a receiver for infrared radiation. U.S. Pat. No. 5,307,077 to Branigan et al. discloses a multi spectral seeker system for detecting radiation in both an infrared band and a plurality of radio frequency bands.

U.S. Pat. No. 5,308,984 to Slwasby et al., is directed to assist in using radar and infrared sensors for detecting low flying aircraft or guided missiles. U.S. Pat. No. 4,264,907 to Durand, Jr. et al., discloses a guided missile receiver for receiving electro magnetic radiation at two different frequencies. U.S. Pat. No. 4,467,327 to Drake et al. discloses simulator intended to simulate both an active and passive missile seeker. An infrared sensor is disclosed in U.S. Pat. No. 4,965,453 to Hoschette et al. In U.S. Pat. No. 5,784,156 to Nicholson, optical fibers receive laser radiation from a target and assist in a guided missile system.

A dual mode RF/IR energy seeker system is disclosed in U.S. Pat. No. 4,477,814 to Brumbaugh et al. In U.S. Pat. No. 5,681,009 to Vandersteen et al., a seeker device has a housing which receives both midwave infrared energy and long wave infrared energy. U.S. Pat. No. 4,576,346 to Gauggle et al. includes a missile seeker head having a distance sensor intended to receive laser energy. A laser transmitter transmits infrared laser energy to a target. The target reflects the energy back to their receiver in the seeker head. This is intended to replace a radar seeker head.

SUMMARY

A dual-mode target seeking apparatus has a seeker dome which defines an aperture and is transmissive to microwave frequency energy of a first frequency and to light wave energy at a second frequency and at a third frequency. An optics system within the seeker dome is transmissive to the microwave frequency energy reflective to the light wave energy received via the aperture. A first detector receives the microwave frequency energy via the aperture, and a second detector images a target by the light wave energy of the second and third frequencies via the optics system.

DETAILED DESCRIPTION OF PREFERRED EMBODIMENTS

Figure 1:
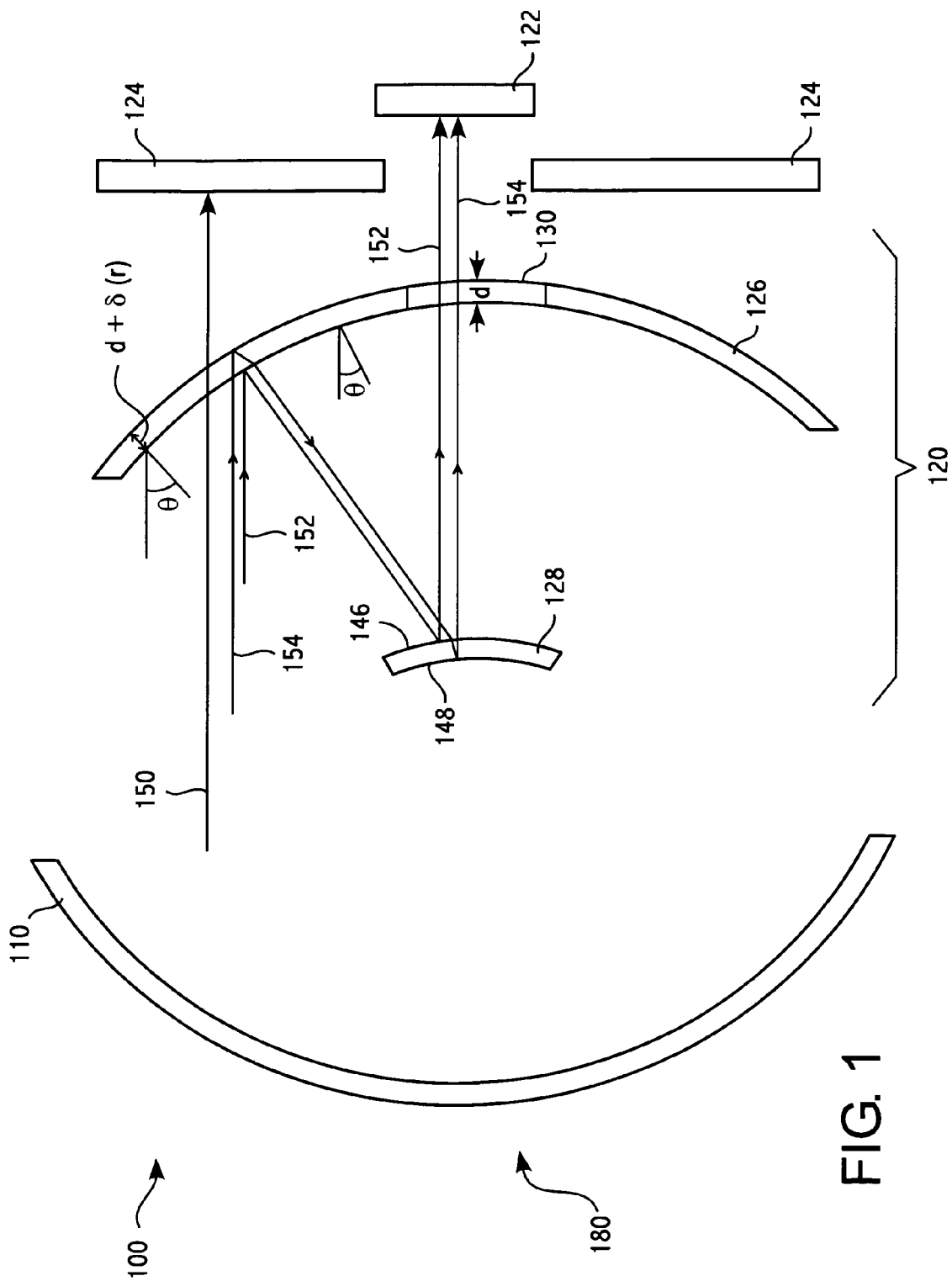
FIG. 1 illustrates an exemplary embodiment of the dual-mode target sensing apparatus.

A first exemplary embodiment of a dual-mode sensing apparatus 100 illustrated in FIG. 1 includes a seeker dome 110 transmissive to microwave energy of a first frequency and to light wave energy at a second frequency and at a third frequency, and an optics system 120 within the seeker dome.

A dual-mode target sensing apparatus 100 is capable of sensing both microwave frequency energy and light wave energy of at least one frequency. By microwave frequency energy, it is meant any energy having a frequency between about $10^9$ hertz to about $10^{12}$ hertz.

The light wave energy can include, for example, infrared energy and/or visible light. The light wave energy can be generated by any suitable light source. The light can be generated by a target or the environment, and/or light sources associated with the sensor apparatus, for example, infrared lasers or semi-active lasers.

The optics system 120 has a first detector 124 for receiving the microwave frequency energy via the aperture 180 and a second detector 122 for imaging a target by the light wave energy via an aperture 180. The first detector 124 for receiving microwave energy, can be, for example, a detector for sensing energy in the Ka band (approximately 20–40 Ghz). In another exemplary embodiment, the first detector can receive and sense millimeter wave energy of about 35 Ghz.

In an exemplary embodiment, the second detector 122 is an apparatus for detecting energy at infrared wavelengths. In another exemplary embodiment, the second detector can detect light wave energy at both an infrared wavelength and at another wavelength, such as a visible light wavelength or at a wavelength generated by a semi-active laser. The second detector can be a silicon quad cell detector, or any other type of detector suitable for detecting infrared, visible, and/or semi-active laser energy.

The use of a semi-active laser source allows the apparatus 100 to receive semi-active laser radiation which is generated by an external source and which reflects off a target. In military aircraft operations, for example, the operator in a laser designator aircraft can designate the target by transmitting semi-active laser radiation toward the target. The semi-active laser radiation thus generated is reflected by the target, and the reflected radiation is received by optical target sensing apparatus 100 in the missile or other remote system.

The semi-active laser radiation can be at various wavelengths. In an exemplary embodiment, the sensing apparatus 100 can detect semi-active laser radiation with a wavelength of 1.06 micrometers. Semi-active lasers which can generate pulses of laser radiation at 1.06 micrometers include Q-switch neodymium YAG lasers.

The seeker dome 110 can be any type of material suitable for protecting the internal components of the apparatus from the environment while permitting the passage of energy at the desired frequencies. The seeker dome 110 can be hemispherical in shape, or can be any tapered shape suitable for flight. In an exemplary embodiment, the seeker dome 110 includes a forward dome section that is a hemisphere transitioning to a cylindrical section of about 177.8 mm in diameter, or to a greater or lesser diameter. The seeker dome 110 can be coated with an optical coating to reduce energy attenuation.

The first detector 124 can be any type of detector suitable for detecting microwave energy. In an exemplary embodiment, the first detector 124 is a dual-polarization radar antenna. The antenna can be any type of antenna suitable for detecting microwave energy, for example, a four quadrant, dual polarization, planar waveguide array antenna. In an exemplary embodiment, the antenna can be a made using at least two planar slotted wave guide array antennas combined into an integrated unit.

FIG. 1 illustrates the optical path of energy transmitted through the seeker dome 110 at different frequencies. As illustrated in FIG. 1, microwave energy at a first frequency 150, light energy having a second frequency 152, and light energy having a third frequency 154 are transmitted through the seeker dome 110.

In an exemplary embodiment, the light energy 152 at the second frequency is infrared energy and the light energy 154 at the third frequency is semi-active laser energy.

The optics system 120, which in an exemplary embodiment includes a primary reflector 126 and a secondary reflector 130, is transmissive to microwave frequency energy and is reflective to the light wave energy received via the aperture 180.

The primary reflector 126 and the secondary reflector 128 are transmissive of the microwave energy at the first frequency 150. As illustrated in FIG. 1, microwave energy at the first frequency 150 is transmitted through the primary reflector 126, and is received by the first detector 124. Light energies at a second frequency 152 and a third frequency 154 is reflected by the primary reflector 126 toward the secondary reflector 128, and are reflected toward a window 130 in the primary reflector 126. The light energies at the second and third frequencies 152, 154 are transmitted through the window 130 to the second detector 122.

The window 130 in the primary reflector 126 can be an opening, or can be a material substantially transparent to the light wave energy at the second and third frequencies 152, 154.

The light energies at the second frequency 152 and the third frequency 154 can be reflected from different surfaces of the primary 126 and secondary reflector 128. In an exemplary embodiment, the inner and outer surfaces of the primary reflector 126 have optical coatings reflective and transmissive at different frequencies. For example, an inner surface 142 of the primary reflector 126 can be reflective at an infrared frequency, while the outer surface 144 of the primary reflector 126 can be reflective at a semi-active laser frequency. Similarly, the secondary reflector 128 can be reflective of light energies at the second and third frequencies 152, 154 at different surfaces.

The primary reflector 126 can also be designed to reduce distortion of the microwave energy. For minimum reflection, a nominal thickness d of the primary reflector 126 can be designed as a function of the angle of incidence of the energy received by the reflector, by the equation $$d = n(\lambda_0/2)(1/(\epsilon_r - \sin^2\theta)^{1/2}),$$

where θ is the angle of incidence of the energy received by the reflector and $\lambda_0$ is the wavelength of the transmitted microwave energy.

As illustrated in FIG. 1, for a curved primary reflector 126, the incidence angle θ of the received microwave energy increases with the radius of the reflector 126. Thus, for minimum reflection, the nominal thickness of the primary reflector should be about 1.5 times the wavelength of the energy. In an exemplary embodiment, the nominal thickness is about 0.32 inches. It will be recognized that a reflector with greater or lesser thickness may also be used.

In an exemplary embodiment, the thickness of the primary reflector 126 increases according to the factor $1/(\epsilon_r - \sin^2\theta)^{1/2}$, so that it is thicker in outer regions of the reflector 126 than in a central region, in order to minimize the undesired reflection of the microwave energy 150, and increase the amount of microwave energy 150 that is transmitted through the primary reflector 126 to the first detector 124.

Figure 2A:
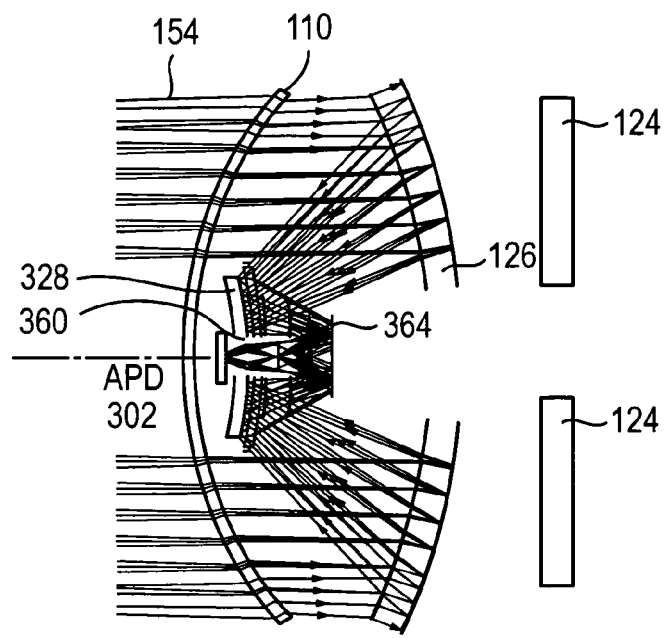
FIGS. 2a–2c illustrate optical characteristics of an exemplary embodiment of an optics system for use in a dual-mode target seeking apparatus.
Figure 2B:
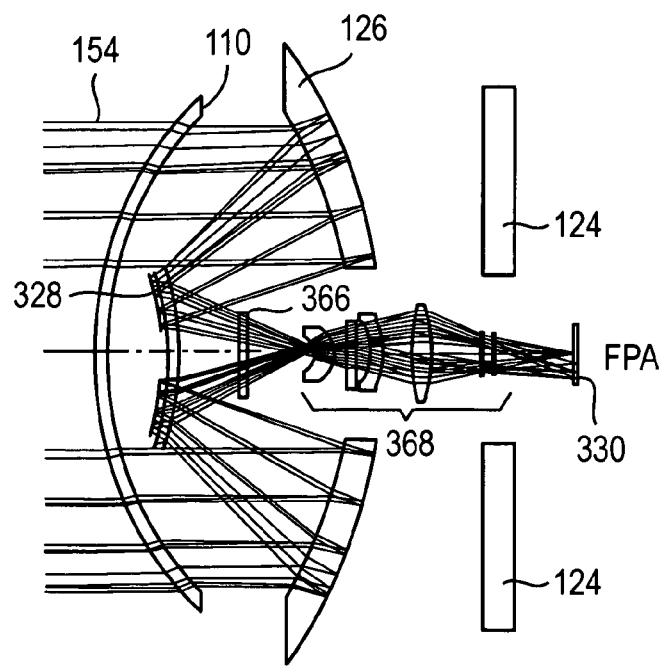
Figure 2C:
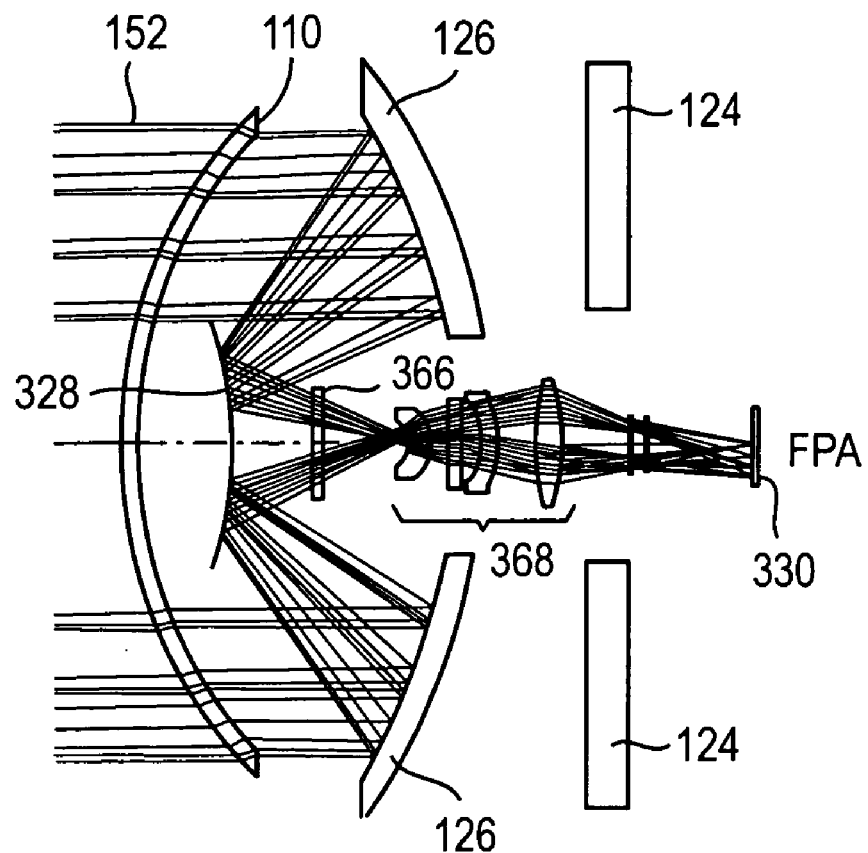

FIGS. 2a–2c illustrate optical flow paths for a second exemplary embodiment of the dual-mode target seeking apparatus 100, in which a third detector 302 can receive light energy at the third frequency 154. The secondary reflector 328 has an aperture 360 through which the light energy at the third frequency 154 can pass. The third detector 302 can be located between the dome 110 and the secondary reflector 328, along an axial center line 362 of the system. An intermediate reflector 364 can be arranged along the axial center line 362 between the secondary reflector 328 and the primary reflector 126.

In this embodiment, pulsed light wave at the third frequency 154 is transmitted through the seeker dome 110 and to the primary reflector 126, where it is reflected back toward the secondary reflector 328. The secondary reflector 328 reflects the light energy at the third frequency 154 toward the intermediate reflector 364, which in turn reflects the light energy 154 through the aperture 360 in the secondary reflector 328, so that the light energy 154 can be received by the third detector 302. The third detector 302 can be any type of detector suitable to detect the light energy 154. When the energy source is in semi-active laser, an avalanche photo diode may be used, although other types of detectors are also suitable.

FIG. 2b illustrates another optical path for light energy at the third frequency 154. The light energy at the third frequency 154 is transmitted through the dome 110 and reflects from a surface of the primary reflector 126 to the secondary reflector 328. The secondary reflector 328 reflects the energy 154 through a transmissive intermediate optical element 366, through a series of optical elements 368, and onto a detector 330. The detector 330 can be, for example, a focal plane array. The optical elements 368 can include, for example, a semi-active laser immersion lens.

FIG. 2c illustrates an optical path of light energy at a second frequency 152, e.g., an infrared frequency. The energy at the second frequency 152 is transmitted through the dome 110 and is reflected from a surface of the primary reflector 126. The energy 152 is reflected by the primary reflector 126 to the secondary reflector 328, which in turn reflects the energy 152 toward the detector 330. The energy 152 is transmitted through the intermediate element 366 and through a series of additional optical elements 368, which can act to focus the energy on the third detector 330.

The embodiment illustrated in FIGS. 2a–2c is suitable for detecting pulses of semi-active laser generated energy and for imaging with semi-active laser energy and infrared energy on the focal plane array 330.

A detector 124 for receiving millimeter wave energy 150 can be located on a side of the primary reflector opposite the dome 110.

Figure 3:
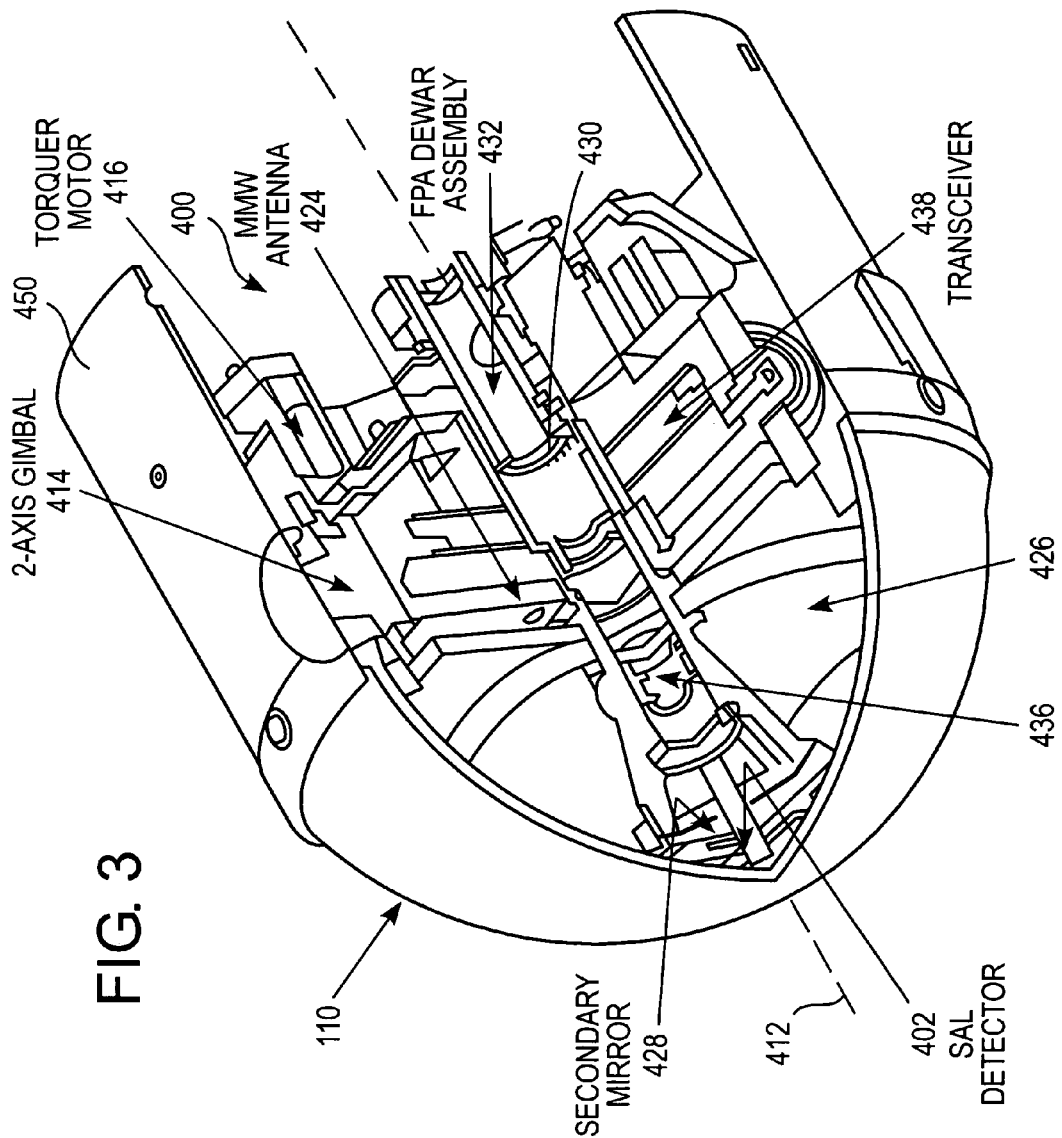
FIG. 3 is an illustration of the another exemplary embodiment of the dual-mode target seeking apparatus.
Figure 4:
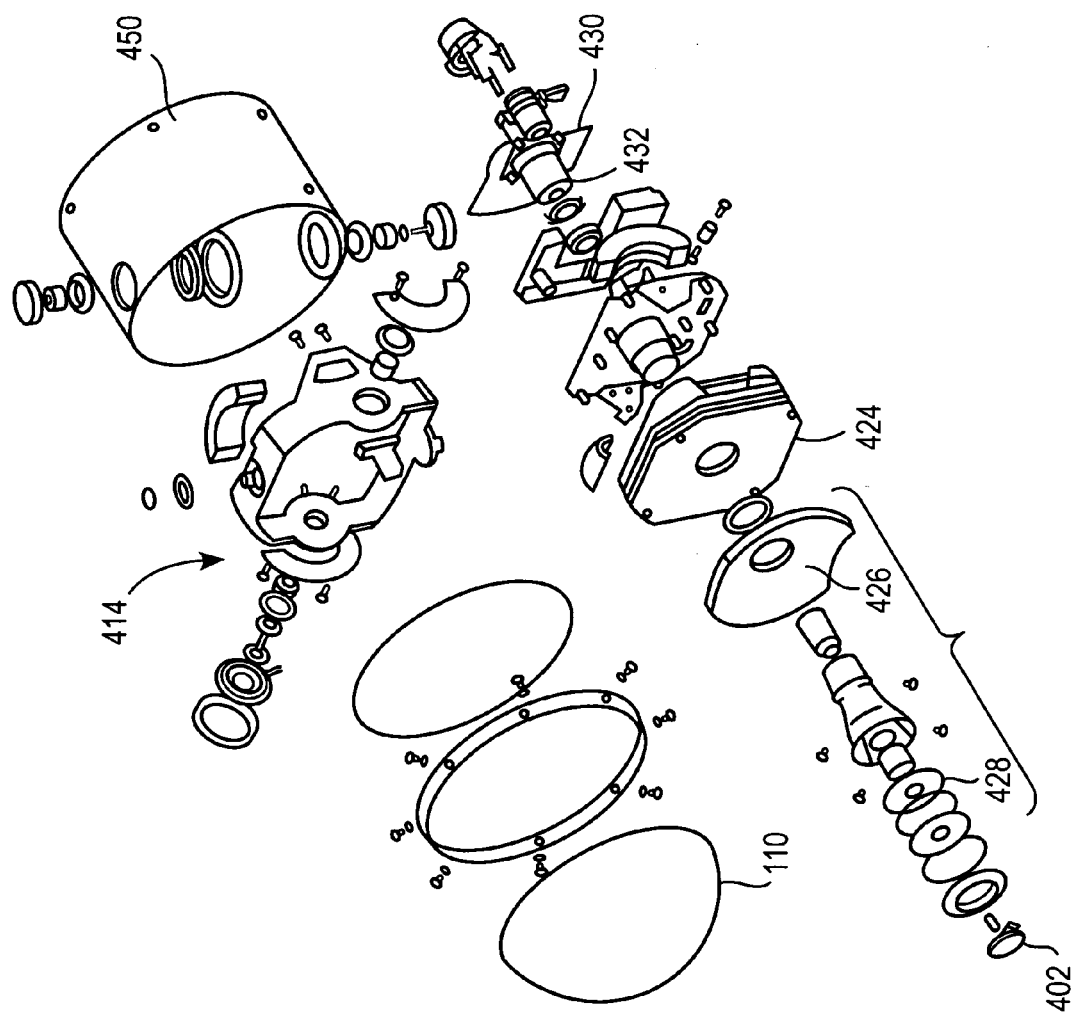
FIG. 4 is an exploded view of the embodiment of FIG. 3.

FIG. 3 illustrates another exemplary embodiment of the invention. A dome 410 is attached with bolts or other attachment devices to a housing 450. Within the dome, an optical system 400 is aligned along a central axis 412 within the housing 450. The components of the optical system 400 can be mounted on a two axis gimbal assembly 414 which is driven by a torque motor 416. The gimbal assembly 414 can include a two-axis rate sensor that outputs rate values to an inertial measurement unit ("IMU").

In an exemplary embodiment, a gimbal assembly 414 can provide a stabilized structure for an antenna, SAL optics, beam former, RF receiver, transmitter, and voltage regulator, as well as pointing the antenna and optics. The gimbal assembly 414 can include an antenna gimbal and actuators, gimbal azimuth an elevation position potentiometers, dual access gimbal rate sensors (GRS), and a gimbal control circuit card assembly (CCA).

A first detector for receiving microwave energy 424 is located coaxially behind the primary mirror 426 and the secondary mirror 428. The optic system 400 is gimbaled to enable the use of a narrower instantaneous field of view to achieve maximum sensitivity in both a microwave and a semi-active laser mode of operation.

A focal plane array 430 is arranged along the central axis 412 behind the antenna 424. In an exemplary embodiment the focal plane array can receive and detect semi-active laser energy, infrared energy, or both. The focal plane array 430 can include a silicon quadrant cell detector which generates video pulse outputs that are proportional to the infrared radiation incident upon the four surfaces of the detector. In an exemplary embodiment, the four segment photo detector generates video pulse outputs proportional to the infrared radiation incident upon the four segment surfaces that are indicative of the relative angle between the source and perpendicular to the detector plane.

A cooling system 432 can be arranged in order to maintain the focal plane array 430 at a low temperature. In an exemplary embodiment the cooling assembly 432 is a Dewar assembly. A silicon quad cell detector heater control circuit can control the cooling system 432 to help regulate the temperature of the detector to maintain a constant noise floor.

The optic system 400 can also include an infrared relay lens assembly for propagating infrared energy reflected by the secondary reflector 428 to the focal plane array 430.

A semi-active laser immersion lens 434 can be arranged between the secondary reflector 428 and the focal plane array 430. The immersion lens 434 can propagate the semi-active laser energy onto the focal plane array 430, and can also help to compensate for any phase shifting that may occur during energy reflection within the optic system 400.

A transceiver 438 can also be arranged within the housing. The focal plane array 430 can receive both infrared and semi-active laser energy, allowing real-time inherent sensor fusion. In addition, a processor can subtract the image from infrared from an image combining infrared and semi-active laser energy. The resulting image will include the semi-active laser energy only. As a result, active counter measures using infrared sources can be defeated; a designate and forget mode can be used; and an offset designation can be included.

The optic system 400 can provide high performance optical transmission of both an infrared and a semi-active laser energy band. The IR relay lens assembly elements 426 focus both infrared and semi-active laser energy on the focal plane array 430. In addition semi-active laser energy is focused on a SAL pulse detector 402 such as an avalanche photodiode or a PIN diode located between the secondary reflector 428 and the seeker dome 110.

Semi-active laser and infrared image fusion can lower detection false alarms, improve automatic target recognition for a single sensor, and robustly track against counter measures.

A microwave image can also be fused with an infrared image, which can reduce false alarms, can enhance automatic target recognition capability, and can improve the track robustness against countermeasures.

In addition, because the useful ranges of the light and microwave energies can overlap, hand off between the microwave ranging and the semi-active laser and the infrared, can allow an operator to designate and forget a target.

Figure 5:
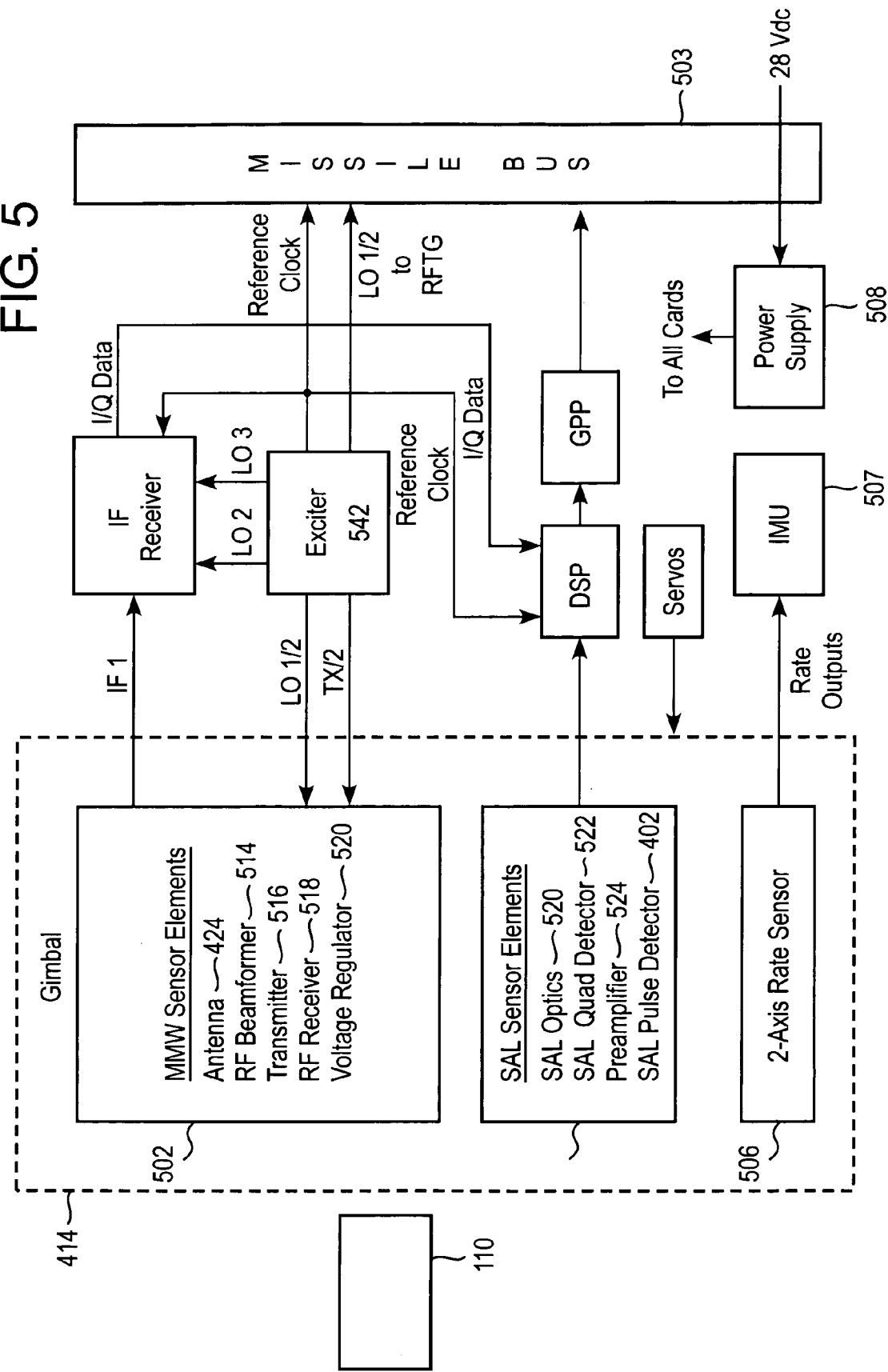
FIG. 5 is a schematic of an exemplary embodiment of the dual-mode target seeking apparatus.

FIG. 5 illustrates a functional block diagram of an exemplary apparatus. The first detector is an antenna 424 which can detect microwave energy, the second detector is a silicon quad cell detector 522 for receiving infrared and semi-active laser energy, and the third detector is a SAL pulse detector 402 for detecting pulsed semi-active laser energy.

A gimbal 414 can include a two-axis rate sensor 506 that outputs rate values to an inertial measurement unit ("IMU") 507.

Millimeter wave sensor elements 502 shown in FIG. 5 include the antenna 424 for receiving and amplifying incoming energy, an RF beamformer 514 operating with the antenna 424 to provide both right hand circular polarization and left hand circular polarization transmission and reception. A transmitter 516 is connected to the RF beamformer 514. An RF receiver 518 providing low-noise signal amplification, and a voltage regulator 520 controls voltage limits within a range.

The SAL sensor elements 204 shown in FIG. 5 include SAL optics 520, a SAL silicon quad detector 522 and a preamplifier 524. A power supply 508 can supply power to a missile bus 503 and various electrical components.

In an exemplary embodiment, all of the lenses and optical elements within the missile seeker head make up an optical telescope. This optical telescope provides a stabilized line of sight (LOS) coincident to the perpendicular of the detector plane.

The preamplifier 524 can provide a high gain for the four video signals from the four quadrants of the silicon quad cell detector and ensures that an adequate signal to noise ratio is provided for further processing by the video amplifier.

In an exemplary embodiment, the antenna 424 can operate with a beamformer 514 to provide both right hand circular polarization (RHCP) and left hand circular polarization (LHCP) transmission and reception. The RF beam former implementation can be a monolithic microwave integrated circuit (MMIC) enabling the formation of sum and delta mode antenna patterns for coherent radar operation and right/left/up/down squinted beams for amplitude monopulse operation.

In an exemplary embodiment, a microwave receiver is a MMIC based or waveguide based single channel receiver operating in a Ka band at about 35 GHz at the input. The RF receiver is connected to the RF beam former via a WR-28 wave guide passage through the transmitter module to the RF receiver to minimize transmission loses. The RF receiver can provide input signal amplification via a low noise amplifier (LNA), can suppress the image side band response via a band pass filter, down the convert Ka band RF to an L band first IF frequency, and then provide additional amplification with a low noise IF amplifier. A single IF channel is carried across the gimbal to the IF receiver via a flexible shielded cable. The X band local oscillator (LO) input from the exciter is tripled by the X3 frequency multiplier in the RF receiver module in order to provide the required Ka band local oscillator (LO) signal for the mixer.

The IF receiver can receive a first L band signal from the RF receiver by means of an interconnecting cable. The first IF L band signal can be further amplified and filtered in the IF receiver prior to the down conversion to a second IF frequency of 240 MHz. The 240 MHz second IF signal can then be sent through a digitally controlled attenuator, amplifier and a second digitally controlled attenuator to provide automatic gain control of the signal (AGC). The AGC loop increases the total dynamic range of the microwave receiver while maintaining a near constant input signal level into the subsequent synchronous demodulator for optimal in-phase (I) and quadrature (Q) detection. The AGC range is 63 db nominal and 40 db minimum. The AGC resolution is greater than or equal to 1.0 db per step with a nominal accuracy of plus or minus 0.5 dB.

The exciter 542 can provides stable local oscillator and intermediate frequencies to the system transmitter and receiver and utilizes low cost commercial technology for coherent radar operation. The exciter 542 can include a 30 MHz uncontrolled crystal oscillator (OCXO) from which all other required frequencies are derived in order to provide the coherent monopulse capability. Two different frequencies are synthesized in the exciter 542 for application to the transmitter. The first is an L band signal that is labeled TXIF since it is applied to the IF port of the mixer used for up converting to the desired final Ka band transmit frequency (nominally 35 GHz) in the transmitter. This particular signal is both amplitude and pulse modulated and biphase (0/180°) modulated via a digital control interface. The second signal synthesized by the exciter is an X band signal (designated LO1/3) that is tripled by the X3 frequency multiplier in the transmitter prior to mixing with the first IF L band signal. The LO1/3 exciter output can be step tuned to greater than 128 frequencies. Channel selectivity can be provided by a serially controlled, single chip, phase locked loop (PLL) driven by the OXCO, or by another device.

In addition to providing the drive signals for the transmitter module the exciter 542 can also generate local oscillator signals (LO) for the RF and IF receiver modules. The LO1/3 X band signal is provided to the RF receiver for X3 multiplication by the frequency tripler in the RF receiver module prior to application to the first down conversion mixer LO port. The exciter also develops an unmodulated LO drive signal for the second down converter located in the IF receiver. This unmodulated signal is designated LO2. The final signal synthesized in the exciter is an unmodulated 240 MHz signal designated LO3, for application to the third down converter in the IF receiver for generation of the base band "I" and "Q" signals.

Figure 6:
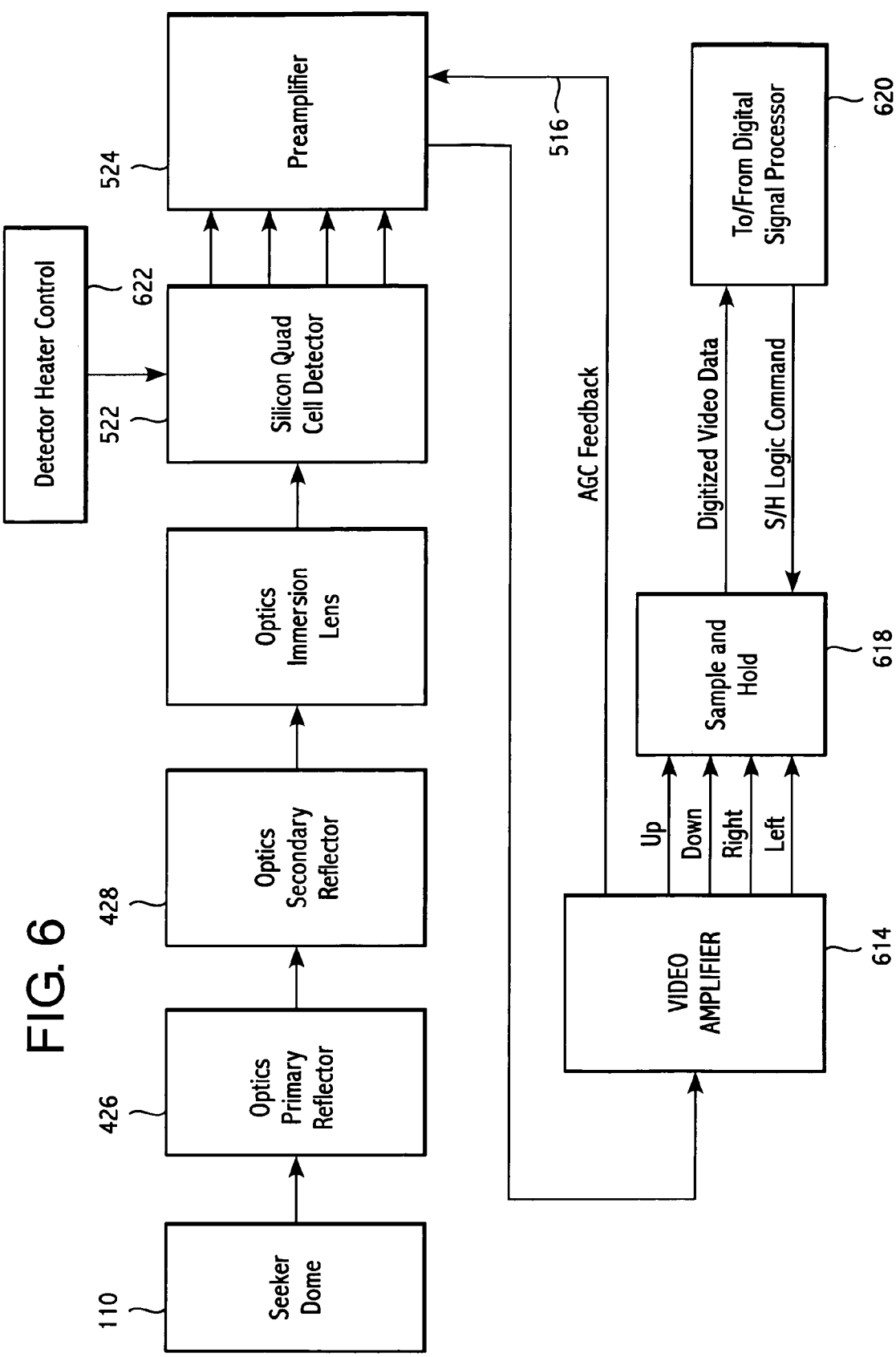
FIG. 6 illustrates a signal flow path for an exemplary embodiment of dual-mode target seeking apparatus.

A video amplifier 614 illustrated in FIG. 6 can provide additional gain as well as generating an automatic gain control ("AGC") 616 feedback signal to the preamplifier 524. This helps to prevent video saturation and corruption of the relative signal levels found in the four video channels emanating from the four quadrants of the detector.

It is preferable that the relative signal level quantities be preserved, since the difference between the signal levels in the up/down quadrants and in the right/left quadrants are indicative of how far off the axis the target is located. The sample and hold circuitry 618 will provide pulse processing logic for a SAL sensor mode. In this mode, the circuitry 618 will receive four video signals and two logic inputs from which it will determine the presence of a valid laser pulse, generate signals indicating the line of sight to the target, and provide pulse presence indication. The sample and hold circuitry 618 can also provide digitized video data to a digital signal processor ("DSP") as well as receive data hold commands from the DSP 620.

In exemplary embodiments, servo compensation circuits and a digital system bus interface for compensation control can mounted on a timing generator/servo CCA as part of a guidance electronics group (GEG) and the motor control power driver circuit in a separate package (gimbal control CCA mentioned above) can be mounted forward at the sensor group bulk head as part of a sensor group gimbal assembly. This packaging concept can provide a good heat sync for the power driver circuits, thus extracting heat from the guidance electronics central electronics. The TG/servo board can also include a digital acquisition system (DAS) for digitizing gimbal azimuth and elevation potentiometer inputs and outputting the signals to a general purpose processor via a system bus for further processing.

In an exemplary embodiment, the GRS mounted on the guidance section enter gimbal can include two orthogonal axes of angular rate sensing instruments. The GRS analog outputs can be transferred to the mounted IMU on the sensor group bulk head behind the gimbal for digitization and temperature compensation. The compensated GRS data is then converted back to analog and sent to the servo for use in the azimuth and elevation antenna stabilization loops.

The circuits for the gimbal motor drives can be dual power operational amplifiers that are mounted on a bulkhead behind the gimbal. This technique can provide an off-gimbal heat sync reduction in the number of wires to the gimbal and independent voltage sources.

The dual-mode targeting sensor apparatus embodiments as described above can provide a missile seeker with millimeter wave radar ("MMW") for achieving fire-and-forget capability, semi-active laser ("SAL") for achieving surgical precision strike capability, and/or imaging infrared ("IIR") for achieving target recognition with a single missile seeker element. In an exemplary embodiment, a Ka-band MMW radar sensor can operate through smoke, rain, snow, fog, clouds, and at night. The SAL mode is intended to provide surgical strike performance against a broad range of both hard and soft targets, relatively unaffected by thermal crossover and thermal clutter. This allows flexibility in missile loading depending on the battlefield environment, the nature of the target, the presence of obscurants, and adverse weather.

In the foregoing description, specific details are set forth in order to provide a thorough understanding of the invention. The description is for purposes of explanation and not limitation. However, it will be readily apparent to those skilled in the art that the present invention may be practiced in other embodiments that depart from the specific details of this exemplary system. Further, although the embodiments described herein have been described and illustrated in a missile embodiment, those skilled in the art will appreciate that this invention can also be used for other sensor applications not limited to guided missiles.

What is claimed is:

1. A dual-mode target sensing apparatus comprising:
   a seeker dome defining an aperture and transmissive to microwave frequency energy of a first frequency and to light wave energy at a second frequency and at a third frequency;
   an optics system within the seeker dome, the optics system being transmissive to the microwave frequency energy and being reflective to the light wave energy received via an aperture, a first detector for receiving the microwave frequency energy via the aperture;

a second detector for imaging a target by the light wave energy of the second and third frequencies via the optics system.

2. The apparatus according to claim 1, wherein the second frequency is an infrared frequency and the third frequency is a semi-active laser frequency.

3. The apparatus according to claim 2, wherein the infrared frequency corresponds to a wavelength between about 3 micrometers and 5 micrometers.

4. The apparatus of claim 3, wherein the second detector is adapted to detect light wave energy having a wavelength of about 3.06 micrometers.

5. The apparatus according to claim 2, wherein the semi-active laser frequency corresponds to a wavelength of about 1.06 micrometers.

6. The apparatus of claim 1, wherein the first detector is adapted to detect microwave frequency energy, and wherein the first frequency is between about 20 gigahertz and about 40 gigahertz.

7. The apparatus of claim 6, wherein the first frequency is in the Ka band.

8. The apparatus of claim 1, wherein the first detector is a four-quadrant, dual-polarization antenna having at least two planar slotted wave guide array antennas combined into an integrated unit.

9. The apparatus according to claim 1, wherein the optics system comprises:

a third detector, responsive to the light wave energy at the third frequency, for detecting a range to the target.

10. The apparatus according to claim 9, wherein the third frequency is a semi-active laser frequency, and the third detector is a PIN diode or an avalanche photodiode.

11. The apparatus of claim 10, having a semi-active laser pulse detection mode and a semi-active laser imaging mode, wherein the first detector is an antenna for receiving microwave energy, wherein the second detector is for imaging with infrared and semi-active laser wavelengths.

12. An apparatus according to claim 9, wherein the optics system comprises:

a first reflector, being reflective at the second and third frequencies and transmissive of the first frequency, arranged between the second detector and the third detector;

a second reflector, being reflective at the second and third frequencies and transmissive of the first frequency, arranged between the first reflector and the aperture, wherein the second reflector reflects light wave energy at the second and third frequencies from the first reflector toward the first detector.

13. The apparatus of claim 12, wherein the second detector has a window allowing transmission of light wave energy to the first detector.

14. The apparatus of claim 12, comprising:

a conical support member for supporting the second reflector, wherein the conical support member having a thickness about equal to an integer multiple of one half of the wavelength of the first microwave frequency.

15. The apparatus of claim 14, wherein the conical support member forms an angle of about 67 degrees with a longitudinal axis of the apparatus.

16. An apparatus according to claim 1, wherein the optics system comprises:

a first reflector, being reflective at the second and third frequencies and transmissive of the microwave frequency, arranged between the second detector and the aperture.

17. An apparatus according to claim 16, wherein the first reflector comprises an optical coating reflective at the second and third frequencies and transmissive of the first microwave frequency.

18. The apparatus of claim 17, wherein the first reflector is thicker in an outer region than in central region.

19. The apparatus of claim 18, wherein the first reflector has a thickness at a center of the first reflector of about an integer multiple of one half of the wavelength of the microwave frequency, and wherein a thickness of the first reflector increases in a direction away from the center of the first reflector by a factor $1(\epsilon_r - \sin^2 \theta)^{1/2}$, wherein $\epsilon_r$ is the emissivity of the reflector and $\theta$ is twice an angle of incidence of light energy on the first reflector.

20. The apparatus of claim 1, comprising:

a two axis gimbal on which the optics system is mounted.

21. The apparatus of claim 1, wherein the seeker dome is coated with an optical coating to reduce energy attenuation.

22. The apparatus of claim 1, comprising:

an antenna for receiving and amplifying incoming energy;

a transmitter whose output is connected to an RF beamformer;

an RF beamformer operating with the antenna to provide both right hand circular polarization and left hand circular polarization transmission and reception;

an RF receiver;

a voltage regulator for controlling voltage limits within a range;

an exciter for providing local oscillation and intermediate frequencies to the transmitter and receiver; and an RF timing generator.

* * * * *